INVENTORS
ELWOOD NORDEN
FREDERICK Q. GEMMILL
ERIC J. ISBISTER
BY
THEIR ATTORNEY

Patented Sept. 11, 1945

2,384,484

UNITED STATES PATENT OFFICE 2,384,484

AIRCRAFT FLIGHT INDICATOR AND SYSTEM

Elwood Norden, Pelham, Frederick Q. Gemmill, Hempstead, and Eric J. Isbister, Brooklyn, N. Y., assignors to Sperry Gyroscope Company, Brooklyn, N. Y., a corporation of New York Application February 8, 1941, Serial No. 378,030

11 Claims. (Cl. 177—311)

This invention relates generally to aircraft instrument indicators and the invention has reference, more particularly, to a novel aircraft flight indicator and system which provides on a single instrument face the combined information collected from a plurality of instruments, such as attitude, rate, and position instruments, the last named being exemplified by radio range or landing beam receiver indicators.

The present invention comprises certain improvements and refinements over what is disclosed and claimed in the copending application of Francis L. Moseley, now Patent No. 2,262,033, dated November 11, 1941, and the copending application of Francis L. Moseley and Joseph Lyman, now Patent No. 2,262,245, dated November 11, 1941.

One object of the present invention is to provide an improved aircraft flight indicator and system having novel instrument pick-off means, the use of which not only enables the system to be simplified but also enables a more accurate indication of the desired information.

Another object of the present invention lies in the provision of improved circuit means for utilizing the pick-up signals for controlling the cathode ray tube indicator.

Still another object of the present invention is to provide a novel flight indicator and system that is so constructed and arranged as to present the desired flight information needed by the pilot in flying or in making an instrument landing in a manner that is most easily understood by the pilot so as to enable him to instinctively fly his craft by use of such indications without undue mental effort and without reference to other instruments.

Another object of the present invention lies in the provision of a novel signal limiting circuit arrangement serving to prevent any patterns or indications from going off scale.

Still another object of the present invention is to provide an indicator of this type having an improved circuit for coupling the indicator to the D. C. output of the localizer and glide path landing receiver.

Still a further object of the invention is to provide an improved mechanical commutator whereby four separate indications are drawn upon a cathode ray tube face by commutating the indications rapidly in succession.

Other objects and advantages of this invention will become apparent as the description proceeds.

Similar characters of reference are used in all of the above figures to indicate corresponding parts.

Figure 1:
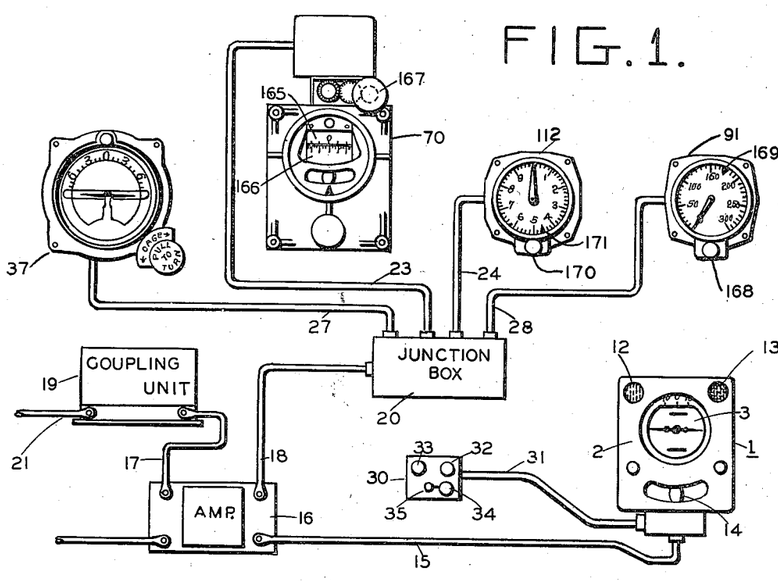
Fig. 1 is a schematic view illustrating the novel aircraft flight indicator and the system of this invention, showing the connections to various instruments whose flight information it is desired to convey to the single instrument face of the indicator.

Referring now to Fig. 1 of the drawings, the reference numeral 1 designates the novel aircraft flight indicator of this invention, which indicator is adapted to be mounted on the pilot's instrument board or at any other convenient location within the aircraft. The indicator 1 comprises a front panel 2 provided with a circular aperture for accommodating the sensitized end or face 3 of a cathode ray tube. As especially illustrated in Fig. 2, the face 3 is provided with a transverse directional scale 4 with which the directional-signal trace 5 cooperates for giving directional gyro or compass indications. Also, upper and lower reference marks 6 and 7 are provided on the face 3 for defining the upper and lower air speed limits betwen which the air speed indicator trace 8 is adapted to move in use. At the center of the face 3 there is depicted the silhouette of a miniature airplane 9, with which the artificial horizon trace 10 cooperates to simulate the motions of the aircraft, on which the indicator is mounted, with respect to the actual horizon.

Figure 2:
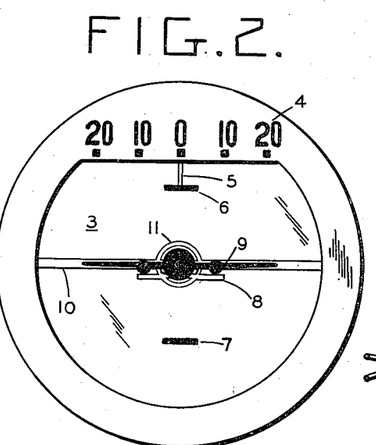
Fig. 2 is a face view of the indicator, illustrating typical indications thereon.

A circle trace 11 is also shown on the face 3, that is controlled in its motion in response to the output from the landing beam receiver, the localizer receiver, and/or altimeter indications. Also, if desired, this circle may be controlled from the radio range receiver output signal.

An outer marker light 12, which may be of purple color, is provided on the upper left hand corner of the instrument, whereas an inner marker light 13, as of amber color, is provided on the upper right hand corner of the instrument, the operation of which lights will be further described. The instrument face is also shown provided at its lower portion with a ball bank inclinometer 14.

The indicator 1 is connected by cable 15 to an amplifier 16 which, in turn, is connected by cables 17 and 18 to a radio coupling unit 19 and to a junction box 20, respectively. The radio coupling unit 19 is connected by cable 21 to a radio landing beam and/or localizer receiver (not shown). The junction box 20 is connected by cables 22 to 25 to the artificial horizon 37, the directional gyro or compass 70, the altimeter 112, and the air speed indicator 91, respectively. Although the above mentioned instruments are preferable, it is to be understood that other instruments or combinations of instruments could be used, if desired.

A function selector 30 is shown connected by cable 31 to the indicator, this function selector having a lamp control knob 32, a cathode ray brilliance control 33, a function selector switch 34, and a focusing adjustment 35.

The several instruments whose indications are to be portrayed by the indicator of this invention may be mounted anywhere on the aircraft, either on the pilot's instrument board or elsewhere, and the same is true of the indicator itself. Where the instruments are not to be used for direct observation, they may be skeletonized, thereby reducing weight.

Figure 3:
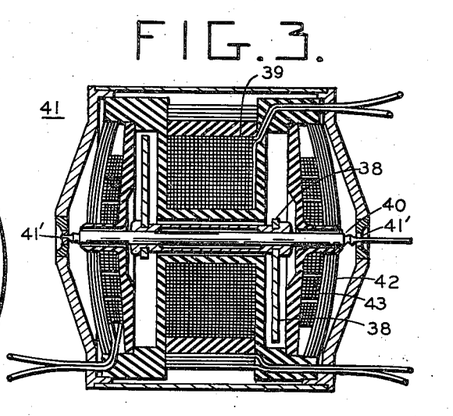
Fig. 3 is a sectional view of a pick-off means.
Figure 4:
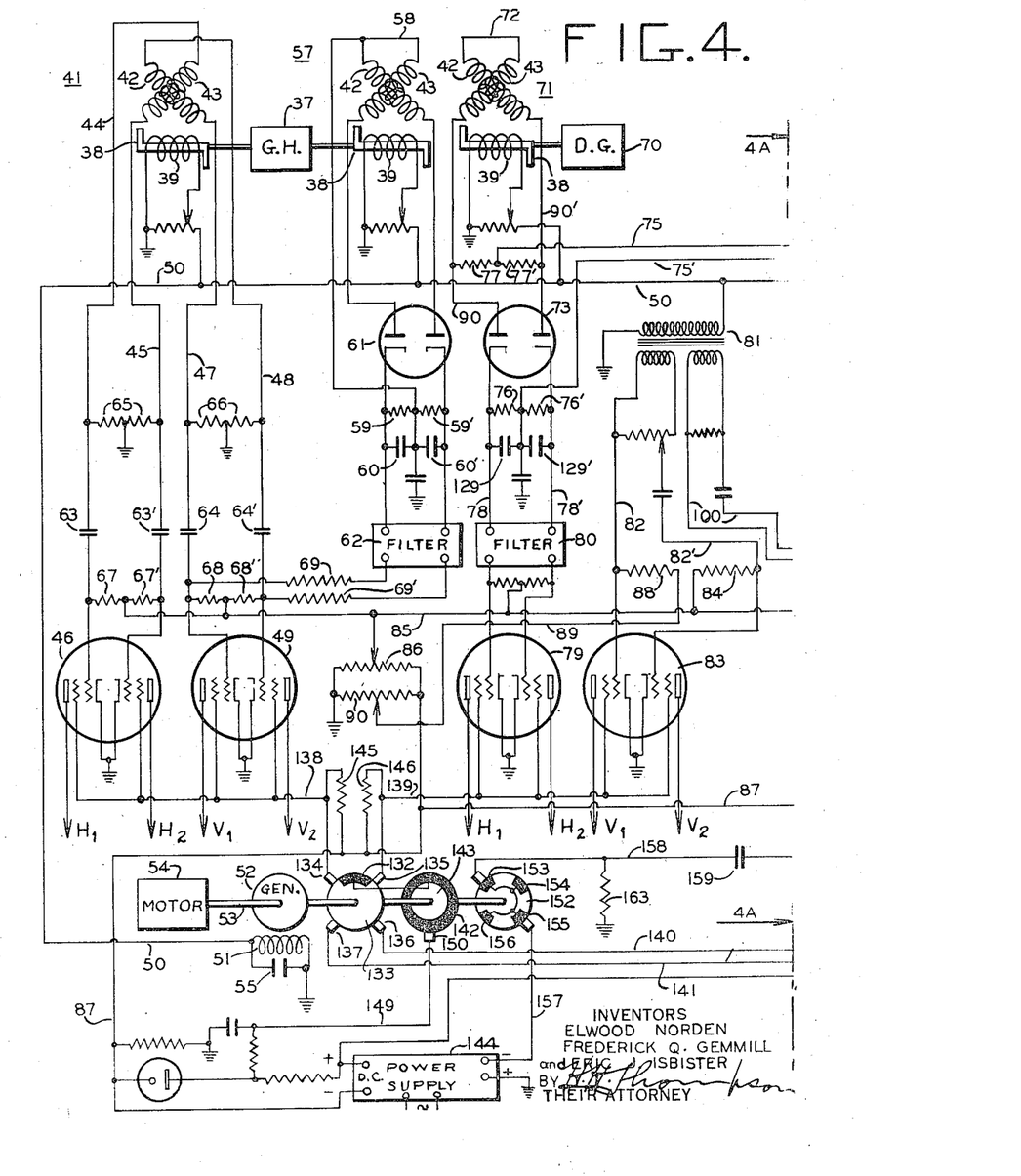
Figs. 4 and 4A constitute a wiring diagram of the indicator and system therefor.
Figure 4A:
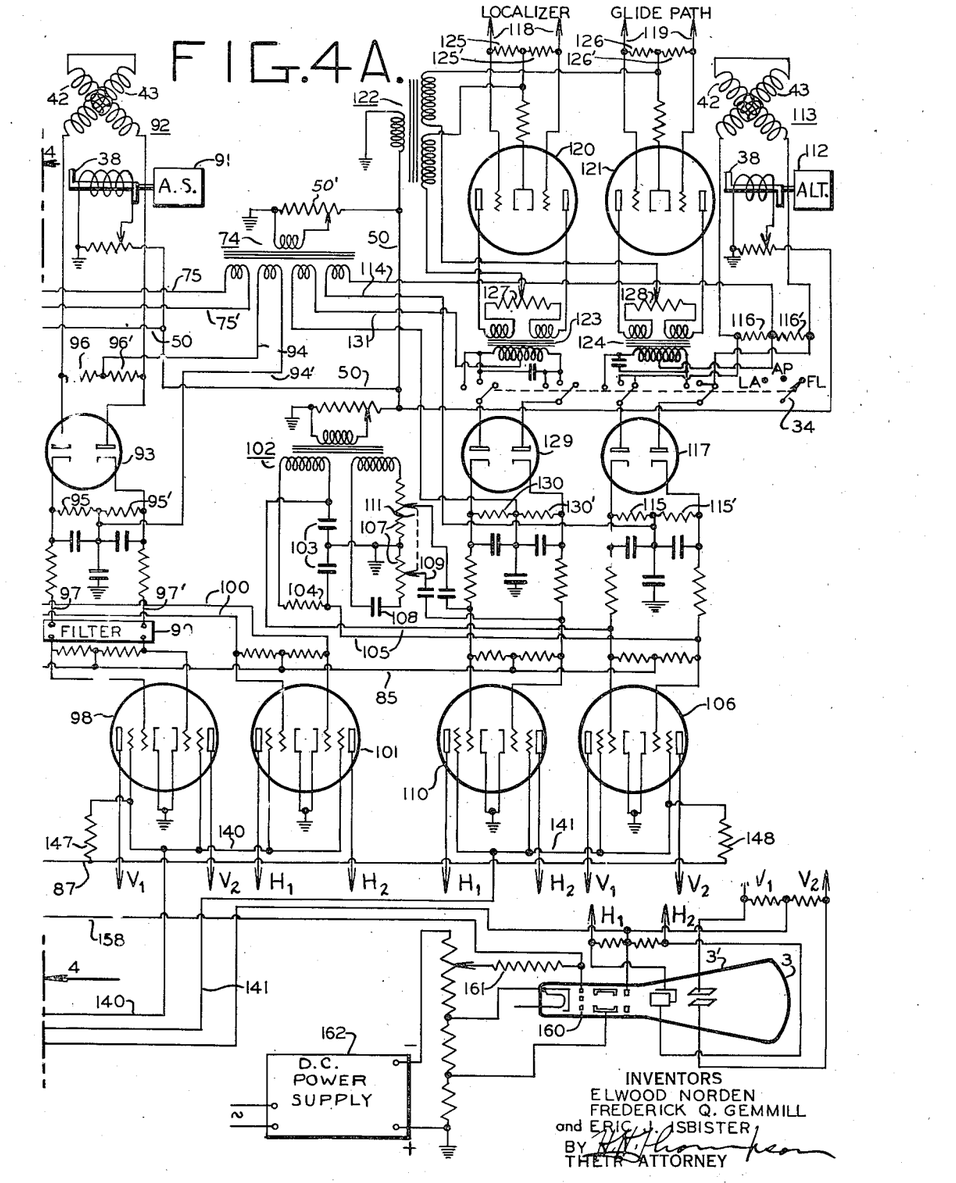

Referring now to the wiring diagram of Figs. 4 and 4A, the artificial horizon 37 is shown as having its roll axis coupled to the Z-shaped rotor or armature 38 (see also Fig. 3) of an electrical pick-off 41 as of the Telegon type. The armature 38 is of iron or other suitable flux conducting material preferably of high permeability. Alternating current is supplied to an armature coil 39 of the pick-off, which coil is positioned to be coaxial with the armature 38 but which is not in mechanical contact with the armature, the coil serving to induce the necessary magnetic fluxes into the armature, thereby eliminating the brush friction which would unduly load the pick-off if the coil were mounted directly on the armature for rotation therewith. The shaft 40 of armature 38 is mounted in jewel bearings 41' to reduce friction to a minimum. The pick-off 41 is provided with two stator windings 42 and 43 arranged with their axes mutually perpendicular and both perpendicular to the axis of coil 39, the ends of the coil 43 being connected by leads 44 and 45 to the grids of an amplifying tube 46 which may be designated as the roll horizontal amplifier. The stator winding 42 has its ends connected by leads 47 and 48 to the grids of an amplifying tube 49 which may be designated as the roll vertical amplifier. It will be apparent that due to their relative positions there would be very slight coupling between coil 39 and coils 42 and 43, respectively, in the absence of the rotor 38. The Z-shape of this rotor tends, in effect, to change the axis of the flux of coil 39 into a plane parallel to that determined by the axes of coils 42 and 43. The lateral extensions of rotor 38 therefore may be considered to be magnets setting up an alternating magnetic field of substantially constant effective value which is rotatable in the plane containing the axes of coils 42 and 43 and induces alternating voltages in these coils respectively proportional to the sine and cosine of the angle at which said lateral extensions are positioned relative to the axis of one of the coils.

Alternating current for armature coil 39 is supplied through a lead 50 from the stator winding 51 of a small alternator whose armature 52 consists of a disc shaped permanent magnet magnetized to have a plurality of pairs of circumferentially spaced poles. This alternator, for example, may supply alternating current at a frequency of 360 cycles per second, which may be at a rate of six cycles for each revolution of its shaft 53 driven from a motor 54. A condenser 55 is shown connected across the stator winding 51 of the generator for improving the power factor and wave shape of the same.

The armature windings 42 and 43 are so set initially with respect to the armature 38 that with the wings of the aircraft level, the voltage induced in coil 43 is a maximum while that induced in coil 42 is zero. It will be noted that the coil 43 having maximum voltage under these conditions of level flight is connected to the roll horizontal amplifier 46, the plates of which amplifier tube are connected by leads $H_1$ and $H_2$ (shown broken in the diagram for purposes of simplifying the same) to the horizontal deflecting plates of the cathode ray tube 3' on whose face 3 is depicted the horizon bar trace 10. Hence, any voltage difference which appears between the two plates of tube 46 will be applied between the horizontal deflecting plates of the cathode ray tube indicator 3', thereby deflecting the cathode ray beam (should the same be on) in proportion to the voltage between the plates.

Since with the wings level there is no voltage induced in winding 42; there is no voltage difference between the output leads $V_1$ and $V_2$ of roll vertical amplifier tube 49 which leads are connected to the vertical deflecting plates of the cathode ray indicator 3'. Therefore, under such conditions, a horizontal line will be drawn on the face 3 of the cathode ray tube, assuming that the same is turned on, and that the outputs of tubes 46 and 49 are connected thereto. As the wings of the craft tilt, the horizontal voltage will go down in value while the vertical voltage, i. e., output of tube 49, whose phase reverses in tilting from one side to the other, will increase from zero. The horizontal deflecting voltage will decrease in proportion to the cosine of the angle of tilt, whereas the vertical deflecting voltage will increase in proportion to the sine of the angle of tilt. Hence, with the wings tilted, both coils 42 and 43 will produce alternating voltages, which when amplified and applied to the cathode ray tube plates will draw a straight line whose length stays constant and which is tilted at the same angle as the wings, this angle being one whose tangent is the ratio of the applied voltages and the direction of whose slope will reverse as the tilt of the wings reverses. This artificial horizon bar tilts with the wings but oppositely to them so that when the ship rolls and the cathode ray tube face rolls with it the artificial horizon bar remains level with the true horizon at all times. It is characteristic of alternating-current pick-offs of the type represented by the device 41 that voltages will be induced in the coils 42 and 43 varying sinusoidally in peak value with relative rotation between the element carrying the coils and the element determining the angular direction of the line of magnetization, in this case, the armature or vane 38. Furthermore, it is characteristic of such devices that there should be a difference in phase between the variations in peak value in the coils with relative rotation because the coils are displaced in space phase. That is, the coils occupy different angular positions and the induced voltage in one coil reaches a peak value when the rotor 38 is in a different angular position from the one in which voltage is at peak value in the other coil. Since the coils 42 and 43 are perpendicular to each other the aforesaid phase displacement is ninety degrees. The horizontal deflection voltage of the cathode ray indicator varies with the cosine of the angle of tilt of the airplane, and the vertical deflection voltage of the cathode ray indicator varies with the sine of the angle of tilt. The horizontal projection of the trace is proportional to the horizontal deflection voltage, and the vertical projection of the trace is proportional to the vertical deflection voltage. The length of the trace is the vector sum of the two projections and remains constant because the vector sum of the sine and the cosine of an angle is always unity regardless of variations in the magnitude of the angle.

In order for the horizon bar trace 10 to indicate pitch, i. e., climbs and dives, the pitch axis of the artificial horizon 37 is connected to the armature 38 of a pick-off 57 that is similar to the pick-off 41. The stator windings 42 and 43 of pick-off 57 are interconnected at an end of each by a lead 58 which lead is connected through resistances 59, 59' and condensers 60, 60' to the cathodes of double diode rectifier tube 61. The other ends of windings 42 and 43 are connected to the respective anodes of this tube 61. The pick-off 57 is set so that during level flight of the aircraft, i. e., no climb or dive, the two pick-off coils 42 and 43 have equal voltages induced in them. Thus, at level flight, the voltages induced across the diode load resistors 59 and 59' will be equal. However, if the craft should pitch up or down, the voltages across 59 and 59' will not be equal and the difference voltage passed through filter 62 to the grids of tube 49 will unbalance the plate currents of the roll vertical amplifier tube causing a unidirectional potential between the leads $V_1$ and $V_2$, i. e., between the vertical plates of cathode ray tube 3' and thereby cause the horizon bar trace 10 to move up or down, as the case may be. Condensers 63, 63' and 64, 64' serve to keep direct current out of the windings 42 and 43 of pick-off 41. Center-grounded resistances 65, 66 serve to lower the impedance of the grid circuits of tubes 46 and 49. Grid resistors 67, 67' and 68, 68' are used to suitably bias amplifier tubes 46 and 49. Resistances 69, 69' serve to prevent the condensers of filter 62 from shorting the A. C. output of winding 42.

The directional gyro 70 is coupled to the armature 38 of an electrical pick-off 71 whose stator windings 42 and 43 are inter-connected at an end of each by a lead 72. The other ends of these windings are connected by leads 90 and 90' to to the plates of a double diode 73. As thus connected, the windings 42 and 43 serve in effect as one continuous winding and cooperate with the armature 38 as in the case of a radio variocoupler or induction regulator, the coupling between the rotor winding 39, acting as a primary, and the windings 42 and 43, acting as a secondary, being varied by turning the armature 38 by the action of the directional gyro 70, as has been described. The Z-shape of rotor 38 causes the flux along the axis of coil 39 to be deflected into a plane at right angles to said axis, the two perpendicularly positioned coils 42 and 43 which are in this manner variably coupled to winding 39 then effectively resolving the constant strength magnetic field due to rotor flux into sinusoidally variable components at right angles to one another. A combination of the voltages induced in coils 42 and 43, effected by a series connection, therefore is a sinusoidal function of the angular position of rotor 38. Such a function, however, is nearly a linear one in the region close to the axis thereof and may be taken to be substantially directly proportional to angular position of the rotor. The pick-off therefore converts an angular displacement of the directional gyro shaft into an alternating voltage, reversible in phase with reversal of indication. Windings 42 and 43 are so oriented that zero output voltage is produced when the craft is on course. An adjustable alternating voltage is supplied from a transformer 74, energized through a potentiometer 50' from lead 50, through one of the transformer secondary windings having leads 75 and 75'. This alternating voltage is supplied between the diode load resistors 76, 76' connected in parallel with the filter condensers 129, 129' on the one side, and the electrical center of the windings 42—43 obtained by resistors 77, 77' connected in series across the output leads 90 and 90' of these windings on the other side. This voltage from leads 75, 75' is thus connected in parallel with the plate circuits of double of diode 73 and may be termed a center leg voltage. It produces two equal unidirectional voltages of opposite polarity across the diode load resistors 76, 76'. Since these voltages are equal and opposite, their difference is zero and no D. C. signal appears across diode leads 78 and 78' and hence between the grids of the directional horizontal amplifier tube 79 so long as the ship is on course and there is no output from windings 42—43.

When the aircraft turns or deviates, however, from a set course, the windings 42—43 will put out an alternating voltage that reverses in phase in passing from one side of the course to the other and which adds to the alternating voltage on one diode plate and subtracts from the alternating voltage on the other diode plate, thus, producing a unidirectional difference voltage across the diode load resistors 76, 76'. This difference voltage is applied through filter 80 to the grids of the tube 79 thereby causing deflection of the cathode ray beam, assuming the same to be on, and hence effecting movement of the directional gyro trace 5 across the cathode tube face, the amount of the deflection being proportional to the magnitude of the A. C. output of the windings 42—43 and to the angle turned through, within limits (up to ±20°, for example).

The center leg voltage supplied from transformer 74 through leads 75—75' serves to limit the signal from windings 42—43 and prevents the directional gyro trace 5 from going off scale. This will be apparent from the following: assuming, for example, that the craft has turned off course and that the output of windings 42 and 43 makes lead 90 positive at the same time that the center leg voltage fed through lead 75 goes positive. With the assumed polarity of the windings 42 and 43, the center-leg voltage 75, 75' between the leads 75 and 75' will aid the voltage drop 77 across the resistor 77 and oppose the voltage drop 77' across the resistor 77'. The current flowing in the resistor 76 will be proportional to the sum of the input voltages 75, 75' and 77 and the current flowing in the resistor 76' will be proportional to the difference between the input voltages 75, 75' and 77. These currents will flow in opposite directions and the output voltage supplied through conductors 78 and 78' to the filter 80 will be proportional to the difference between the said currents in the resistors 76 and 76'. The output to the filter will be proportional to the voltage across either of the equal resistors 77 and 77' so long as this voltage does not exceed the center-leg voltage between the leads 75 and 75'. The potentiometer 50' is so adjusted that when the amount of deviation from course reaches a predetermined value, in this case 20°, the voltages across resistors 77 and 77' become equal to the center-leg voltage between leads 75 and 75'. Any further deviation, producing further increase in voltage across the resistors 77 and 77', will cause no further increase in the output voltage and therefore no further deflection of the trace 5 beyond the 20° mark. The output voltage will not increase because, now, the current in the resistor 76 is proportional to the voltage 77 plus the center-leg voltage and the current in the resistor 76' is proportional to the voltage 77' minus the center-leg voltage. The voltages 77 and 77' being equal, the difference between the two currents remains constant at a value proportional to twice the center-leg voltage 75, 75'.

The vertical component of the directional gyro trace is provided by a small alternating voltage from one secondary of a transformer 81 that is energized from lead 50. This voltage is applied through leads 82 and 82' to the grids of a directional vertical amplifier 83 whose plates are connected by the leads V1 and V2 to the vertical deflecting plates of the cathode ray tube 3', this voltage serving to produce the desired vertical length of the trace 5.

In order to move this trace 5 up against the scale 4 adjacent the top of the cathode ray tube, the two grids of tube 83 are provided with a fixed differential permanent bias. Thus, the right-hand grid of tube 83 is connected by lead 82' through resistor 84 to lead 85, the voltage of which latter is determined by the setting of potentiometer 86 connected to the negative supply lead 87. The left hand grid of tube 83 on the other hand is connected by lead 82 through resistor 88 and lead 89 to potentiometer 90 connected to lead 87, whereby the differential bias may be determined at will.

The directional gyro 70 is provided with an upper course setting card 165 to which the stator of the pick-off 71 is attached. The lower card 166 is the directional gyro card. A course setting knob 167 is connected for turning the upper course setting card 165 and for turning the stator of pick-off 71 with respect to rotor 38, thereby enabling any desired gyro course to be flown and still obtain a zero reading of the directional gyro trace 5 for the set course.

The airspeed meter 91 is connected for turning the armature 38 of an electrical pick-off 92 similar to pick-off 71. One end of each of the stator windings 42 and 43 of this pick-off are interconnected and the other ends connected to the plates of a double diode rectifier 93. An alternating voltage is supplied from transformer 74 through leads 94 and 94' between the diode load resistors 95 and 95' and the electrical center of the windings 42 and 43 obtained by resistors 96 and 96' connected in series across the plates of tube 93. This voltage from leads 94 and 94' is thus connected in parallel with the two plate circuits of double diode 93 and produce two equal direct voltages of opposite polarity across load resistors 95 and 95'. Since these voltages are equal and opposite, their difference is zero and no D. C. signal appears across the diode leads 97, 97' and hence between the grids of the airspeed vertical amplifier 98 so long as the airspeed remains fixed. However, should the airspeed change, the windings 42—43 will put out an alternating voltage that adds to the A. C. voltage on one diode plate and subtracts from the alternating voltage on the other diode plate, thus producing a unidirectional voltage across the diode resistors 95, 95'. This difference voltage is applied through filter 99 to the grids of the tube 98, thereby causing vertical deflection of the cathode ray beam, assuming the same to be on, and hence effecting vertical movement of the airspeed indicator trace 8 up and down the face 3 of the cathode ray tube, the amount of deflection being dependent on the magnitude of the A. C. output of windings 42—43, i. e., to the change in airspeed taking place and the direction of the deflection depending on whether the airspeed is increasing or decreasing. The action of the center leg voltage from leads 94, 94' also serves to prevent the airspeed trace 8 from going off the face 3' just as in the case of the directional gyro trace.

The horizontal component of the airspeed indicator trace 8 is provided by an alternating voltage from a secondary of transformer 81, which voltage is applied through leads 100 to the grids of an airspeed horizontal amplifier 101 whose plates are connected by the leads H1 and H2 to the horizontal deflecting plates of the cathode ray tube 3', this voltage serving to produce the desired horizontal length of the trace 8. Thus, it will be noted that the airspeed control circuit is very similar to the corresponding directional gyro circuit. While filters 62, 80 and 99 improve the operation, they are not essential.

The airspeed meter 91 is provided with a setting knob 168 connected to rotate the stator of pick-off 92 with respect to the rotor 38, an index 169 moving with the stator over the airspeed meter scale. Thus, any set air speed is made to correspond to a mid-scale position of the trace 8 on the face 3 of the cathode ray tube.

The circle pattern 11 is drawn by applying equal voltages 90° apart in time phase to the vertical and horizontal deflecting plates of the cathode ray tube 3'. These voltages are supplied by the secondaries of a transformer 102 energized from lead 50. One of the secondaries of transformer 102 has condensers 103 and resistor 104 connected thereto for applying a leading voltage to leads 105 connected with the grids of the circle vertical amplifier 106. The other secondary of transformer 102 has resistors 107 and condenser 108 connected thereto for applying a lagging current to leads 109 connected with the grids of the circle horizontal amplifier 110. Resistors 107 are gang controlled by contactor arm 111 to adjust the voltage of one side of the transformer output to make up for any difference in deflection plate sensitivity.

The altimeter 112 is connected for turning an armature 38 of an electrical pick-off 113 that is similar to pick-offs 70 and 91. An alternating center leg voltage is supplied from transformer 74 through leads 114 between the diode load resistors 115 and 115' and the electrical center of the windings 42 and 43 of pick-off 113 obtained by use of resistors 116, 116' connected in series across the outputs of windings 42 and 43. The function selector switch 34, when in the flight (FL) or approach (AP) positions serves to connect the output of windings 42 and 43 to the plates of double diode 117 that is connected in turn to the grids of circle vertical amplifier 106. The altimeter is provided with a setting knob 170 connected to rotate the stator of pick-off 113 with respect to its rotor, an index 171 moving with the stator over the altimeter scale. Hence, any set altitude is made to correspond to a zero reference with the circle trace 11 concentric with the fuselage of the miniature airplane. With the craft's elevation corresponding to that for which the altimeter 112 is set, the circle trace 11 will be concentric with the fuselage of the miniature airplane 9 shown on the front of the cathode ray tube 3'. Should, however, the craft's elevation depart from this set value the windings 42—43 of pick-off 113 will put out an alternating voltage that adds with the center leg A. C. voltage, supplied from transformer 74, on one diode plate and subtracts from the alternating voltage on the other diode plate, thus producing a unidirectional voltage across the diode load resistors 115 and 115'. This difference voltage is supplied to the grids of tube 106, thereby causing vertical deflection of the circle 11, assuming the cathode ray tube to be on, the amount of deflection being dependent on the magnitude of the alternating output of windings 42 and 43, i. e., on the change in the altimeter indication and direction of the deflection depending on whether the craft is ascending or descending. Thus, any deviation of the circle 11, up or down, indicates a deviation from a set altitude. Here again the center leg voltage acts to keep the circle from going off the face of tube 3'. When the function selector switch 34 is thrown to land position (LA), the vertical movement of the circle is no longer controlled from the altimeter but is controlled from the glide path output of the landing receiver. Also, when the function selector switch 34 is either in the flight or approach positions, the circle horizontal amplifier 110 is controlled by the localizer output of the landing receiver.

The landing receiver has its D. C. localizer output supply through leads 118 and its D. C. glide path output supplied through leads 119 of cable 21 connected to coupling unit 19. This landing receiver output is several volts high with respect to ground and to connect the receiver directly to the grids of the diodes would cause trouble with currents flowing through common grounds and with bias supplies. To overcome this difficulty, A. C. operated amplifier tubes 120, 121 are connected between these D. C. landing receiver outputs and the diodes 129 and 117. Amplifiers 120 and 121 are transformer isolated thus eliminating ground trouble. The landing receiver outputs are zero for on course positions. Any deviation from course results in a unidirectional voltage whose polarity depends on direction, whether off to one side or the other in the case of localizer output and up or down in the case of the glide path output. Amplifiers 120 and 121 are push-pull connected with an A. C. supply from transformer 122 energized from lead 50. With no D. C. on the grids of tubes 120 and 121, equal and opposite half-cycle pulses flow in the two halves of the plate transformers 123 and 124, whereby these currents buck each other and the net secondary voltage of these transformers is zero. When D. C. voltage is supplied across either leads 118 or 119 causing current flow in either grid resistors 125, 125' or 126, 126', the two grids of the connected amplifier 120 or 121, as the case may be, are biased relative to their cathode, one up and the other down. This causes an unbalance in the plate currents of the tube and an alternating voltage appears across a secondary of the corresponding transformer 123 or 124. The secondary voltage is alternating whose phase reverses with reversing input grid polarity and whose magnitude is proportional to the amount of D. C. voltage at the input.

Potentiometers 127, 128 are respectively connected in the divided transformers 123, 124 for balancing the plate currents at zero input in case the outputs of tubes 120 and 121 are unbalanced. The output of amplifier 120 feeds into double diode 129 when the function selector switch 34 is in either the approach or land positions. The diode circuit 129 is similar to that of 117 which, in turn, is similar to that of the directional gyro and airspeed meter, the load resistors 130 and 130' of tube 129 being supplied with a center leg alternating voltage as is also true of the tube plates from a secondary of transformer 74 through leads 131. Thus, should the aircraft deviate to one side or the other of the localizer path, the resulting signal amplified by tube 110 will be applied to the horizontal deflecting plates of the cathode ray tube 3', thereby moving the signal 11 to one side or the other, as the case may be.

Thus, there are produced on the face of the instrument four traces, the artificial horizon trace 10 which simulates the actual horizon with respect to the miniature airplane 9; the directional gyro trace 5 which simulates the directional gyro; the airspeed meter trace 8; and the circle trace 11, the vertical movements of which are responsive to either the altimeter 112 or to the glide path receiver output, and horizontal movements of which are responsive to the localizer output of the landing receiver. In flying the aircraft, the pilot merely keeps the miniature airplane 9 central with respect to these several traces or patterns, as indicated in Fig. 2, in flying his course either during normal navigation or while making a landing. In flying a normal course, with switch 34 in the FL position, as pointed out above, the vertical movements of the circle 11 is controlled from the altimeter and the transverse movements of the circle may be controlled if desired, from a radio range beacon. During approach and landing, with switch 34 in either the AP or LA positions, the circle transverse movements are controlled from the landing beam localizer output, whereas the vertical movements of the circle are controlled from the glide path signal.

Since there is only one cathode ray tube used, it is necessary that these traces be drawn separately by commutating from one to the other in rapid succession, as was disclosed in Patent No. 2,262,245, hereinbefore referred to. In the present structure, the traces are drawn by switching the screen grids of the amplifier tubes 46, 49, 79, 83, 98, 101, 110 and 106. The plates of the horizontal amplifiers 46, 79, 101 and 110 are all connected in parallel and with the horizontal deflecting plates of the tube 3'; likewise the plates of vertical amplifier tubes 49, 83, 98 and 106 are all connected in parallel and with the vertical deflecting plates of tube 3'. The screen grid commutation is accomplished by use of a rotating conducting segment 132 carried by an insulating disc 133, driven from the motor 54. Four brushes 134, 135, 136, 137 bear upon the disc 133. Brush 134 is connected by a lead 138 to the screen grids of tubes 46 and 49. Brush 135 is connected by a lead 139 to the screen grids of tubes 79—83. Brush 136 is connected by a lead 140 to the screen grids of tubes 98 and 101. Brush 137 is connected by a lead 141 to the screen grids of tubes 110 and 106. Segment 132 is connected to a conducting ring 142 carried by an insulating disc 143. The negative side of a D. C. power supply 144 is connected through lead 87 and resistors 145, 146, 147, 148 to leads 138, 139, 140 and 141, respectively, for negatively biasing the screen grids on the amplifier tubes so as to thereby bias these tubes off except when positive pulses are supplied to these grids. These positive pulses are supplied from the positive side of the supply 144 through lead 149, brush 150, ring 142 and segment 132 to the brushes 134, 135, 136 and 137 in succession as segment 132 rotates. Thus, as shown in the drawings, brush 135 has just ridden off segment 132 and brush 134 is just about to ride upon this segment. Upon engaging this segment a positive voltage pulse will pass through lead 149, ring 142, segment 132 and lead 138 to bias amplifier tubes 46 and 49 on for such time as brush 134 engages segment 132, thereby causing these tubes to supply the cathode ray tube deflecting plates with the necessary potentials for drawing the artificial horizon trace 10. Likewise when brush 137 is engaged by segment 132 a positive pulse will be supplied through lead 141 to bias the circle drawing amplifiers 110 and 106 on to thereby supply the cathode ray tube deflecting plates with suitable potentials for drawing the circle trace 11. The other potentials for drawing the directional gyro trace 5 and the airspeed trace 8 are similarly applied to the cathode ray tube deflecting plates in proper sequence.

Figure 5:
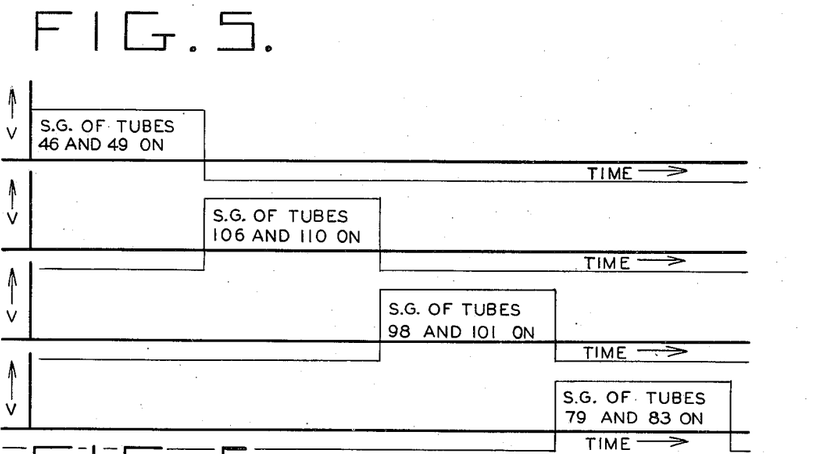
Figs. 5, 6 and 7 are explanation graphs.

Fig. 5 indicates graphically the times that these screen grids of the several tubes are biased on, the ordinates on these graphs indicating voltage on the screen grids while the abscissae corresponds to time.

Figure 6:
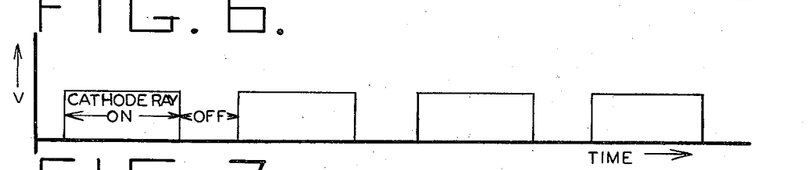

The commutating means is provided with a third insulating disc or section 152 having four conducting segments 153, 154, 155, 156 that are electrically interconnected and adapted to be engaged by opposite brushes, one of these brushes being connected by lead 157 to a negative terminal of supply 144, the other brush being connected by lead 158 through isolating condenser 159 to the control grid 160 of the cathode ray tube 3'. Whenever leads 157 and 158 are interconnected by opposite segments such as 153 and 155, the cathode ray tube is biased off, shown graphically in Fig. 6, thereby turning off the cathode ray trace while the screen commutator moves from one position to another. In other words, the negative pulse is sent through condenser 159 to the control grid of the cathode ray indicator for the duration of the pulse determined by the angular extent of segment 153, etc., and the angular position of the brushes. This eliminates any back trace of the cathode ray beam, thereby preventing confusion of the indications in passing from one to another. Condenser 159 serves to isolate the high voltage supply of the cathode ray tube; while resistance 161 serves to keep the pulse from being short-circuited by the filter condensers in the high voltage supply 162 of the cathode ray tube. Resistor 163 serves to discharge the condenser 159 between pulses. The commutation frequency may be about 60 cycles per second which is more than high enough to cause indications on the cathode ray tube to appear as continuous indications, due to persistence of vision.

Figure 7:
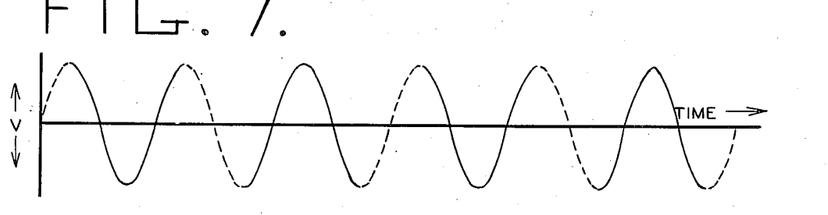

Fig. 7 is a graph showing the pattern drawing voltage, the solid lines corresponding to the duration of the successive patterns on the screen while the dotted lines indicate the periods that the patterns are not drawn, owing to the action of commutator section 152. It will be noted that each indication is on the screen for at least a complete cycle thereby enabling the complete drawing of each trace.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In an aircraft flight indicator, in combination, an aircraft instrument, pick-off means connected with said instrument for producing reversible phase alternating signal voltage responsive to the indication of said instrument, rectifier means connected for receiving said signal voltage, a source of center-leg alternating voltage with connections for supplying said voltage in common phase relation to said rectifier means, said center-leg voltage being connected to be additive with said signal voltage in part of said rectifier means and subtractive in the remainder of said rectifier means, a cathode ray tube having deflection circuits and connections for applying a version of the direct current output of said rectifier means to said deflection circuits to produce a pattern on the face of said cathode ray tube interpreting the indication of said instrument, said center-leg voltage serving to limit the direct current output of said rectifier means thereby preventing the cathode ray pattern from going off the face of the tube.

2. In an aircraft flight indicator, in combination, an aircraft instrument, pick-off means associated with said instrument for producing reversible phase alternating signal voltage responsive to the indication of said instrument, a pair of rectifiers connected for receiving said signal voltage, a source of center-leg voltage, means for adjusting the magnitude thereof and connections for supplying said center-leg voltage in common phase relation to said rectifiers but additive with said signal voltage at one of said rectifiers and subtractive at the other rectifier, a cathode ray tube having a deflection circuit and connections for applying a version of the direct current output of said rectifiers to said deflection circuit to produce a pattern on the face of said cathode ray tube interpreting the indication of said instrument, adjustment of said center leg voltage serving to adjust the value of direct current output of said rectifiers thereby preventing the cathode ray pattern from going off the face of the tube.

3. In an aircraft instrument, a landing glide path receiver means for providing a glide path signal, a landing localizer receiver means for providing a localizer signal, a course receiver means for providing course signals, an altimeter means for providing altitude signals, a cathode ray tube, means for controlling said tube by said glide path and said localizer signals for landing indication, means for controlling said tube by said course and said altitude signals for normal flying indication, and means for rendering effective only one or the other of said controlling means to thereby select either landing or normal flying indications.

4. In an aircraft flight indicator including a flight instrument, a pick-off supplying an alternating voltage signal proportional to the indication of said instrument, a radio receiver supplying a reversible polarity continuous voltage signal output and an indicator for actuation by both said instrument and receiver outputs, a coupling circuit for said receiver comprising a push-pull amplifier-modulator including an alternating voltage power supply therefor, said modulator supplying an alternating voltage output reversible in phase with reversal of polarity of a continuous voltage input thereto, circuit means for connecting the output of said receiver to the input of said modulator, and means for applying the signal outputs of said instrument and modulator in sequence to said indicator.

5. In an aircraft flight indicator in combination, a plurality of aircraft instruments, pick-off means connected with certain of said instruments for producing reversible phase alternating signal potentials responsive to the indications of said instruments, thermionic diodes connected for receiving said signal potentials, means for supplying an auxiliary alternating current potential in common phase relation to said diodes, said auxiliary potential being adjusted to be additive with said signal potentials at certain of said diodes and subtractive at others thereof, a cathode ray tube having deflecting plates, and commutating means for applying a version of the direct current outputs of said diodes to the deflecting plates of said cathode ray tube in desired sequence to produce patterns on the face of said cathode ray tube interpreting the indications of said instruments, said auxiliary potential serving to limit the D. C. outputs of said diodes, thereby preventing the cathode ray patterns from going off the face thereof.

6. In an aircraft flight indicator in combination, a plurality of aircraft instruments, pick-off means connected with certain of said instruments for producing reversible phase alternating signal potentials responsive to the indications of said instruments, diodes arranged in push-pull for receiving said signal potentials, amplifiers connected for amplifying the D. C. outputs of said diodes, a cathode ray indicator, and commutating means for applying said amplified D. C. outputs to said cathode ray indicator in desired sequence for producing instrument patterns on the face of said indicator, said commutating means including means for eliminating back traces of said patterns.

7. In an aircraft flight indicator in combination, a plurality of aircraft instruments, pick-off means connected with certain of said instruments for producing reversible phase alternating signal potentials responsive to the indications of said instruments, diodes arranged in push-pull for receiving said signal potentials, alternating current supply means for supplying the push-pull diodes with cophasal auxiliary alternating potentials in such manner that said auxiliary potentials are additive with the signal potentials at certain of said diodes and subtractive at others thereof, said auxiliary potentials serving to limit the outputs of each pair of push-pull diodes, a cathode ray indicator, and commutating means for connecting the limited outputs of said diodes in desired sequence to said cathode ray indicator for producing instrument indications on the face thereof.

8. In an aircraft flight indicator, an artificial horizon, pick-off means comprising a rotor connected to the roll axis of said artificial horizon, an alternating current supply connected for exciting said rotor, said pick-off means having a stator comprising cross windings, amplifiers connected for receiving the outputs of said windings, a pick-off having a rotor connected to the pitch axis of said artificial horizon, said rotor being excited from said A. C. supply, said pitch axis pick-off having a stator, means for rectifying the output of said last-named stator and for applying said rectified output to one of said amplifiers, a cathode ray tube indicator having deflecting plates, and means for applying the outputs of said amplifiers to said deflecting plates.

9. In an aircraft flight indicator, a landing receiver providing D. C. outputs, alternating current amplifying means connected for amplifying the outputs of said landing receiver, an altimeter, pick-off means connected to said altimeter for producing reversible-phase alternating signal potentials responsive to indications of said altimeter, diodes connected for selectively receiving the outputs of said amplifying means or of said pick-off means and for converting the same to unidirectional potentials, means for further amplifying said unidirectional potentials, a cathode ray tube, means for causing the cathode ray of said tube to draw a circle on the face thereof, and means utilizing said amplified unidirectional potentials for shifting said circle over the face of said cathode ray tube.

10. In an aircraft flight indicator, a plurality of aircraft instruments including a landing receiver having D. C. outputs responsive to localizer and glide path beams respectively, said D. C. outputs being zero when the aircraft is on course and departing from zero as the aircraft departs from course, the polarity of said outputs depending upon the direction of deviation from course, an altimeter, pick-off means operated from said altimeter for producing an alternating potential of variable magnitude and reversible phase corresponding to the indications of said altimeter, a cathode ray indicator having deflecting plates, and switching means for applying a version of the output of said altimeter pick-off means to certain of said cathode ray deflecting plates during the normal flying of the aircraft, said switching means serving to apply versions of the outputs of said altimeter pick-off means and said landing receiver localizer beam output to said cathode ray deflecting plates during the approach operation of said aircraft, said switching means also serving to supply versions of said landing receiver localizer beam and glide path outputs to said deflecting plates during the landing operation of the aircraft.

11. In an aircraft flight indicator in combination, a plurality of aircraft instruments, electrical pick-off means associated with certain of said instruments supplying alternating voltage signal outputs, thermionic tube means for receiving the outputs of said pick-offs and that of the remaining instruments, a cathode ray indicator, commutating means for applying the outputs of said thermionic tube means in desired sequence to said cathode ray indicator for producing patterns on the face thereof continuously responsive to the indications of all said instruments, a supply of alternating potential said thermionic tube means including means for limiting the potentials supplied to said cathode ray tube for preventing the patterns from going off-scale comprising a balance rectifier biased from said alternating potential supply.

ELWOOD NORDEN.
FREDERICK Q. GEMMILL.
ERIC J. ISBISTER.